United States Patent
Murakami et al.

(10) Patent No.: US 6,791,299 B2
(45) Date of Patent: Sep. 14, 2004

(54) METHOD FOR ACTIVATING SECONDARY BATTERY

(75) Inventors: Yusai Murakami, Hamamatsu (JP); Tadao Kimura, Kobe (JP); Seiji Bito, Chigasaki (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/112,260

(22) Filed: Mar. 29, 2002

(65) Prior Publication Data

US 2002/0145405 A1 Oct. 10, 2002

(30) Foreign Application Priority Data

Apr. 10, 2001 (JP) ......................................... 2001-111633

(51) Int. Cl.⁷ ................................................. H02J 7/00
(52) U.S. Cl. ...................................... 320/130; 320/128
(58) Field of Search ................................. 320/130, 128, 320/133, 134, 152, 161, 162, 164

(56) References Cited

U.S. PATENT DOCUMENTS

| | | | | |
|---|---|---|---|---|
| 5,493,196 A | * | 2/1996 | Feldstein | 320/118 |
| 5,998,968 A | * | 12/1999 | Pittman et al. | 320/130 |
| 6,204,641 B1 | * | 3/2001 | Sakakibara | 320/153 |
| 6,275,006 B1 | * | 8/2001 | Koike et al. | 320/125 |
| 6,313,605 B1 | * | 11/2001 | Tsenter | 320/125 |
| 6,377,030 B1 | * | 4/2002 | Asao et al. | 320/161 |

* cited by examiner

*Primary Examiner*—Lawrence Luk
(74) *Attorney, Agent, or Firm*—Merchant & Gould P.C.

(57) ABSTRACT

A method for activating a secondary battery is provided that enables sufficient activation of a secondary battery in a short time. A secondary battery is activated with a varying current, e.g., pulse current, in which current values in a charge direction and a discharge direction are repeated alternately in a cycle ranging from 1 to 30 seconds.

4 Claims, 6 Drawing Sheets

METHOD FOR ACTIVATING SECONDARY BATTERY

BACKGROUND OF THE INVENTION

1. Field of the Invention

The present invention relates to a method for activating an alkaline secondary battery such as a nickel-metal hydride secondary battery.

2. Description of the Related Art

A nickel-metal hydride secondary battery, which is an example of an alkaline secondary battery, includes a positive electrode containing nickel oxide as an active material and a negative electrode containing a hydrogen absorbed alloy as a construction material. The nickel-metal hydride secondary battery is assembled by placing one or more electrode groups, each including the positive electrode, the negative electrode and a separator intervening therebetween in a case; pouring an alkaline electrolyte into the case; and then sealing an opening of the case. The nickel-metal hydride secondary battery thus assembled is subjected to an activation process prior to delivery in order to stabilize the battery capacity and to ensure the reliability during actual use. Also, a nickel-metal hydride secondary battery suffering from a decrease in the battery capacity by the self-discharge due to the long-term storage is subjected to the activation process prior to delivery.

A general method as a method for activating the nickel-metal hydride secondary battery includes charging and discharging the battery with a constant current or constant voltage. The charging is carried out under such a charging condition that the value of the charging current is determined considering the increases in internal pressure and temperature of the battery in the vicinity of a full charge, and the charge amount is set to exceed the battery capacity, if time allowable, to prevent the occurrence of the memory effect. On the other hand, the discharging is carried out under such a discharging condition that the battery ultimately is discharged with a discharging current of 2 A until the operating voltage per cell is reduced to 1 V, so that no capacity would remain after completion of the discharging, in consideration of the subsequent charging and the memory effect. The secondary battery is activated by repeating this charge/discharge cycle a predetermined number of times.

However, the conventional activation method has the following problems.

FIG. 5 shows the activity of the battery, which is represented by a decrease in internal resistance (DC-IR) of the battery, with respect to the number of charge/discharge cycles. The internal pressure of the battery at the end of charging is also shown in FIG. 5. In FIG. 5, each charge/discharge cycle consists of a charging period in which the battery is charged with the charging current of 10 A up to a capacity of 7 Ah, a quiescent period of 10 minutes, and a discharging period in which the battery is discharged with a discharging current of 10 A and then of 2 A until the voltage per cell is reduced to 1 V. As can be seen from FIG. 5, the activity of the battery improves (i.e., DC-IR decreases) proportionally to the number of charge/discharge cycles within the range that the internal pressure of the battery at the end of charging does not rise beyond the predetermined value (0.5 MPa in this drawing) at which a relief valve is opened. However, if the number of charge/discharge cycles is increased to activate the battery sufficiently, a longer time is required for activation. Efficient process control thus cannot be achieved.

FIG. 6 shows changes in internal pressure and voltage per cell during the charge/discharge cycles. As shown in FIG. 6, when the value of the charging current is increased to 20 A (charging capacity: 7 Ah) in order to shorten the time required for charging for the purpose of shortening the time required for battery activation, increases in internal pressure and temperature of the battery become greater, thereby reducing the charging efficiency of the battery and making the charging difficult. This is attributed to the fact that in the battery that has been just assembled, the electrolytic solution insufficiently penetrates into the pole plates. If the battery is forcibly charged, the following troubles cause the battery to degrade. For example, the relief valve is opened to cause a gas leak as shown in the portion enclosed with the dashed line in FIG. 6, and the active materials drop off since the pole plates are lubricated and the networks of the binding agent are broken as a result of the synergistic effect given by the gas generated and surplus electrolytic solution. Thus, to avoid such troubles, it is considered advisable to set the charge amount small.

However, if the charge amount is set to be smaller than the battery capacity, the charging voltage curve is deformed due to the memory effect. Therefore, the regions having a large remaining capacity left uncharged are activated slowly and thus insufficiently, thereby causing a decrease in the battery capacity.

On the other hand, when the value of the discharging current is made greater in order to shorten the time required for discharging for the purpose of shortening the time required for battery activation, heat is generated in the battery, which prevents sufficient discharge of the battery. In the case where the battery cannot be discharged sufficiently, or in the case where the battery is not fully discharged in order to shorten the time required for discharging, it becomes unclear how much remaining capacity is in a charged state. This may bring about the risk of overcharge or may cause insufficiently activated regions to be generated.

The battery capacity also is reduced at the turning portion from discharging to charging since the discharging voltage decreases due to the memory effect, thus deforming the discharging voltage curve.

SUMMARY OF THE INVENTION

The present invention has been made in light of the above-mentioned problems in the prior art. It is an object of the present invention to provide a method for activating a secondary battery that enables sufficient activation of a secondary battery in a short time.

In order to achieve the above object, a method for activating a secondary battery according to the present invention includes activating a secondary battery with a varying current in which current values in a charge direction and a discharge direction are repeated alternately in a predetermined cycle.

According to this method, the secondary battery is charged and discharged with the varying current in which current values in a charge direction and a discharge direction are repeated alternately in a predetermined cycle, for example, 1 to 30 seconds, instead of the constant current or constant voltage used in the conventional charge/discharge cycles. Increases in internal pressure and temperature of the battery thus can be suppressed, thereby allowing the sufficient activation of the battery in a short time. This method can be applied to a nickel-metal hydride secondary battery, for example.

In the above-mentioned method, it is preferable that the varying current is set so that a charge amount and a discharge amount with respect to the battery are the same. According to this preferable example, if the charging and discharging are carried out with respect to the battery from a fully charged condition, the charge level of the secondary battery gradually shifts in the discharge direction since the charging efficiency is less than 100%, and gets closer and closer to SOC (State of Charge) of 100%. Accordingly, the battery can be activated within a short time without fear of overcharge.

Alternatively, in the above-mentioned method, it is preferable that the varying current is set so that a charge amount into the battery is greater than a discharge amount out of the battery. According to this preferable example, the charge level of the secondary battery settles at a certain value when the charge amount, which is set to achieve an excess amount of charging, is balanced against the charging efficiency. Accordingly, the battery can be activated within a short time until it reaches a fully charged condition without fear of overcharge. Moreover, there is no concern that the charging/discharging voltage curves may be deformed due to the memory effect.

In this case, it is preferable that the varying current is set so that the discharge amount is in a range of 90% to 99.99% of the charge amount with respect to the battery. The lower limit of 90% corresponds to the ratio of the discharge amount to the charge amount at which the relief valve is not opened by the increase in the internal pressure of the battery due to the excess amount of charging. On the other hand, the upper limit of 99.99% corresponds to the ratio of the discharge amount to the charge amount that ensures the battery to have an excess amount of charging.

In the above-mentioned method, it is also preferable that the varying current has a quiescent period between a period in which the varying current has a value in the charge direction and a period in which the varying current has a value in the discharge direction. By providing the quiescent period as a transition period from discharging to charging and from charging to discharging, increases in internal pressure and temperature of the battery can be suppressed, thereby allowing test conditions to be set easily.

In the above-mentioned method, the varying current is a pulse current.

These and other advantages of the present invention will become apparent to those skilled in the art upon reading and understanding the following detailed description with reference to the accompanying drawings.

DETAILED DESCRIPTION OF THE PREFERRED EMBODIMENTS

Hereinafter, a preferable embodiment of the present invention will be described with reference to the accompanying drawings.

Figure 1:
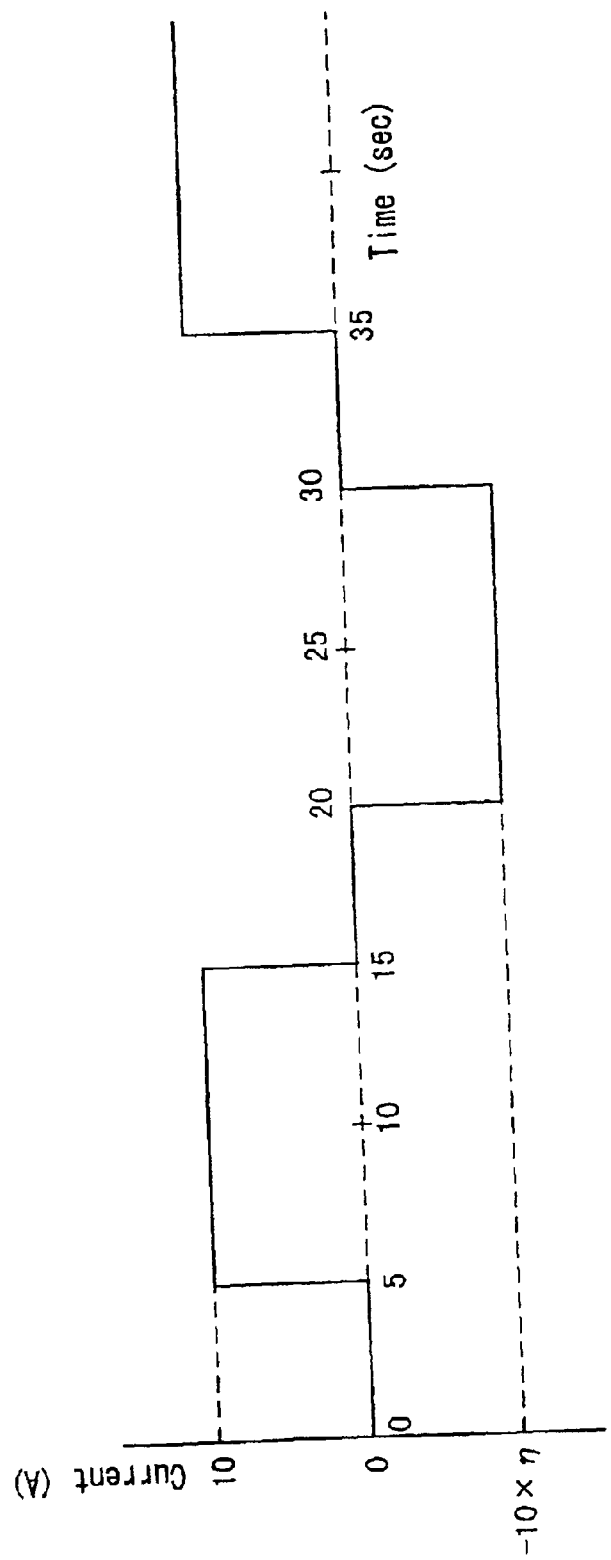
FIG. 1 is a timing chart showing a waveform of a charge/discharge pulse current used in a method for activating a secondary battery according to an embodiment of the present invention.

FIG. 1 is a timing chart showing a waveform of a charge/discharge pulse current used in a method for activating a secondary battery according to an embodiment of the present invention. In FIG. 1, $\eta$ denotes a ratio of a discharge amount to a charge amount, and a value in the positive direction of the vertical axis denotes a current value in the charge direction while a value in the negative direction of the vertical axis denotes a current value in the discharge direction.

The method for activating a secondary battery according to the present embodiment is based on a nickel-metal hydride secondary battery with a rated capacity of 7 Ah. As shown in FIG. 1, the charge/discharge pulse current has a cycle of 30 seconds. The current value in the charge direction is set to be 10 A while the current value in the discharge direction is set to be $10 \times \eta$ A. A charging period and discharging period both are set to be 10 seconds. Further, a quiescent period of 5 seconds is provided between the charging period and the discharging period.

In FIG. 1, when the ratio $\eta$ is set to be 1, the charge amount and the discharge amount due to the charge/discharge pulse current are made equal. However, since the nickel-metal hydride secondary battery has the charging efficiency of less than 1, the battery can be activated without fear of overcharge.

Further, when the ratio $\eta$ is set in the range of 0.9 to 0.9999, the charge amount exceeds the discharge amount to achieve an excess amount of charging. This can bring about the following advantages as compared with the case where the charge amount and the discharge amount are set to be equal. That is, the charge level of the secondary battery settles at a certain value when the charge amount, which is set to achieve an excess amount of charging, is balanced against the charging efficiency so that the battery can be activated until it reaches a fully charged condition without fear of overcharge. Also, the concern that the charging/discharging voltage curves may be deformed due to the memory effect can be eliminated.

Figure 2:
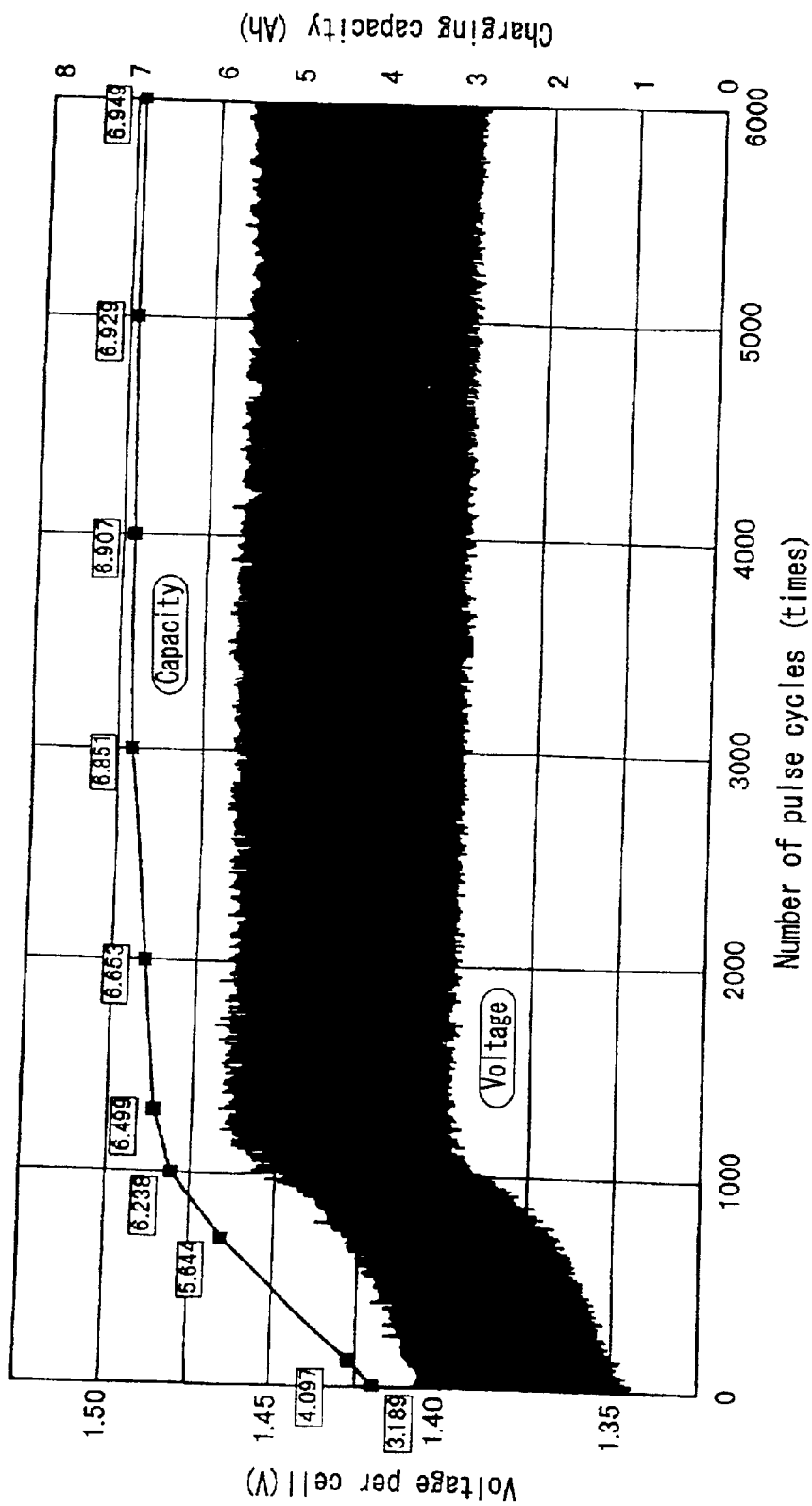
FIG. 2 is a graph showing changes in a voltage per cell and in a charging capacity with respect to the number of cycles of the charge/discharge pulse current used in the activation method of the present embodiment.

FIG. 2 is a graph showing changes in a voltage per cell and in a charging capacity with respect to the number of cycles of the charge/discharge pulse current ($\eta=0.95$) shown in FIG. 1. As can be seen from FIG. 2, when the number of pulse cycles of the charge/discharge pulse current exceeds 1200, i.e., after an elapse of at least 10 hours (30-second cycle×1200 times), the battery is charged up to a capacity of about 6.5 Ah while the rated capacity thereof is about 7 Ah and the battery voltage increases almost to reach the predetermined value.

Figure 3:
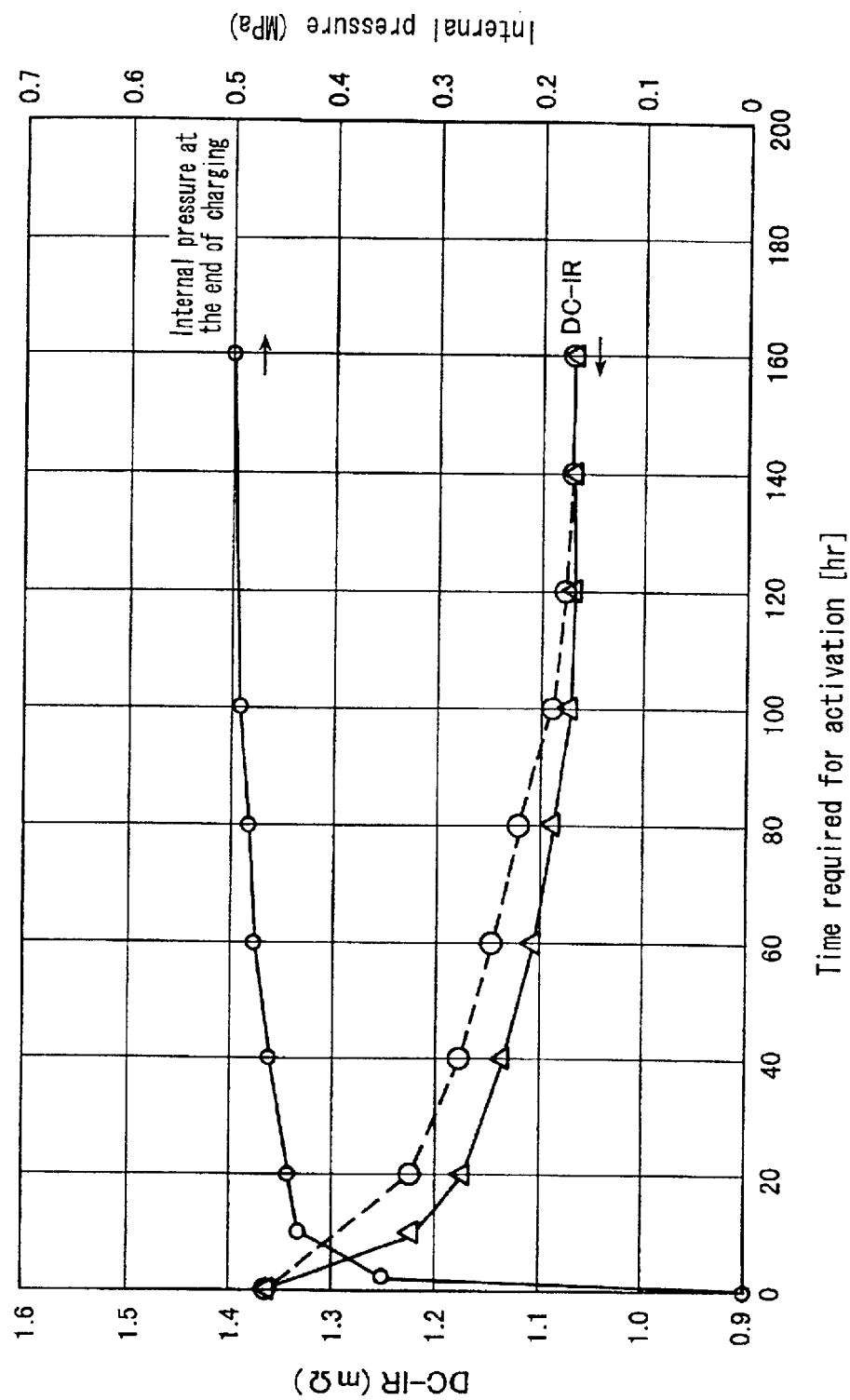
FIG. 3 is a graph showing degrees of the decreases in DC-IR corresponding to the activity of the battery between the battery activated by the present embodiment and that activated by the conventional example.

FIG. 3 is a graph showing the degrees of the decreases in DC-IR corresponding to the activity of the battery between the battery activated with the charge/discharge pulse current ($\eta=0.95$) shown in FIG. 1 and that activated with a constant current or constant voltage according to the conventional example. It is to be noted that, in FIG. 3, the charge/discharge rates with respect to the respective batteries are set to make the increases in internal pressure of the respective batteries equal in order to compare the present embodiment with the conventional example.

As can be seen from FIG. 3, the DC-IR (represented by the solid line) in the battery activated with the pulse cycles using the charge/discharge pulse current according to the present embodiment decreases in a shorter time as compared with the DC-IR (represented by the dashed line) in the battery activated with the conventional charge/discharge cycles using a constant current or constant voltage. From this fact, it is understood that the method according to the present embodiment can improve the activity of the battery in a shorter time.

Figure 4:
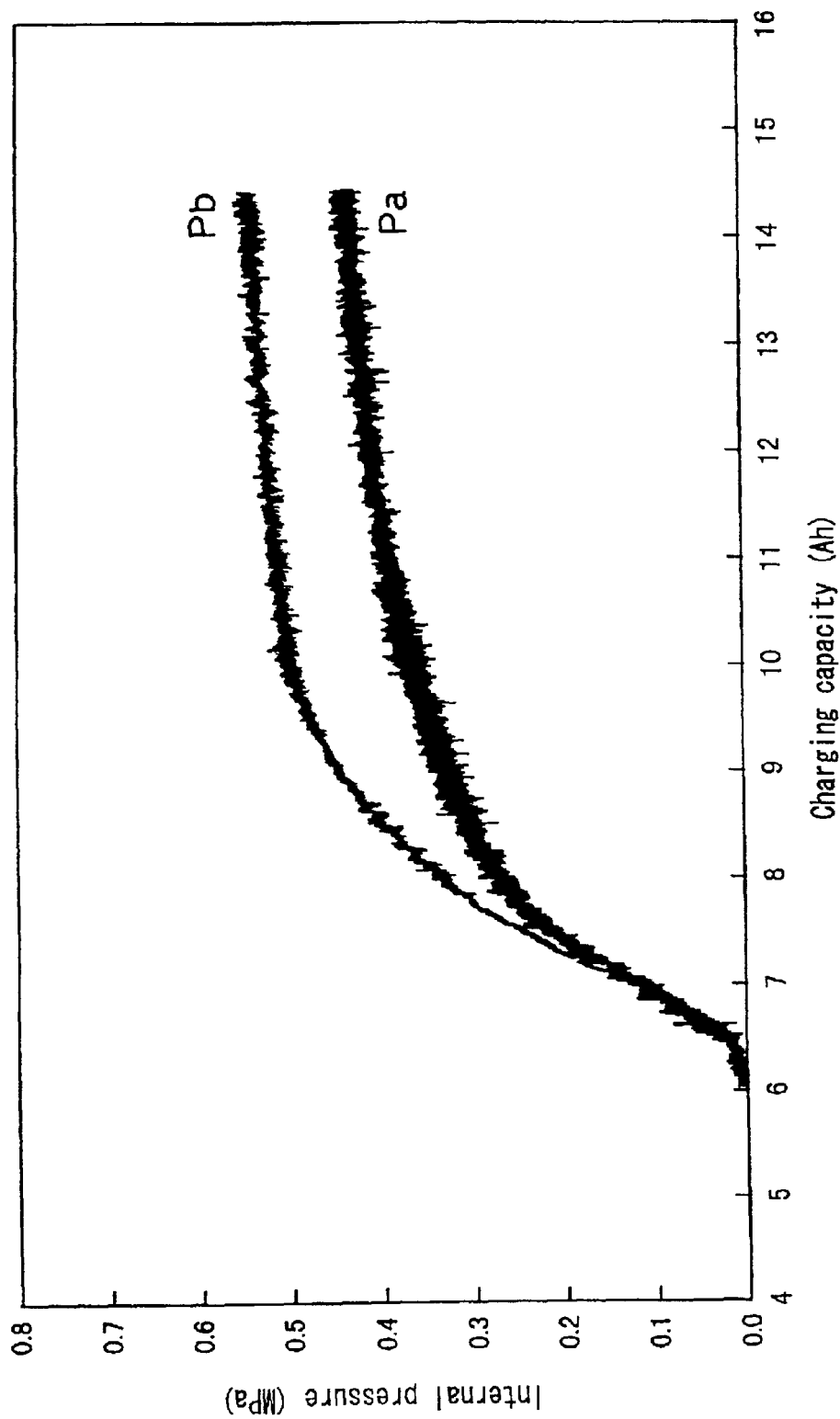
FIG. 4 is a graph showing changes in internal pressure with respect to a charging capacity between the battery activated by the present embodiment and that activated by the conventional example.
Figure 5:
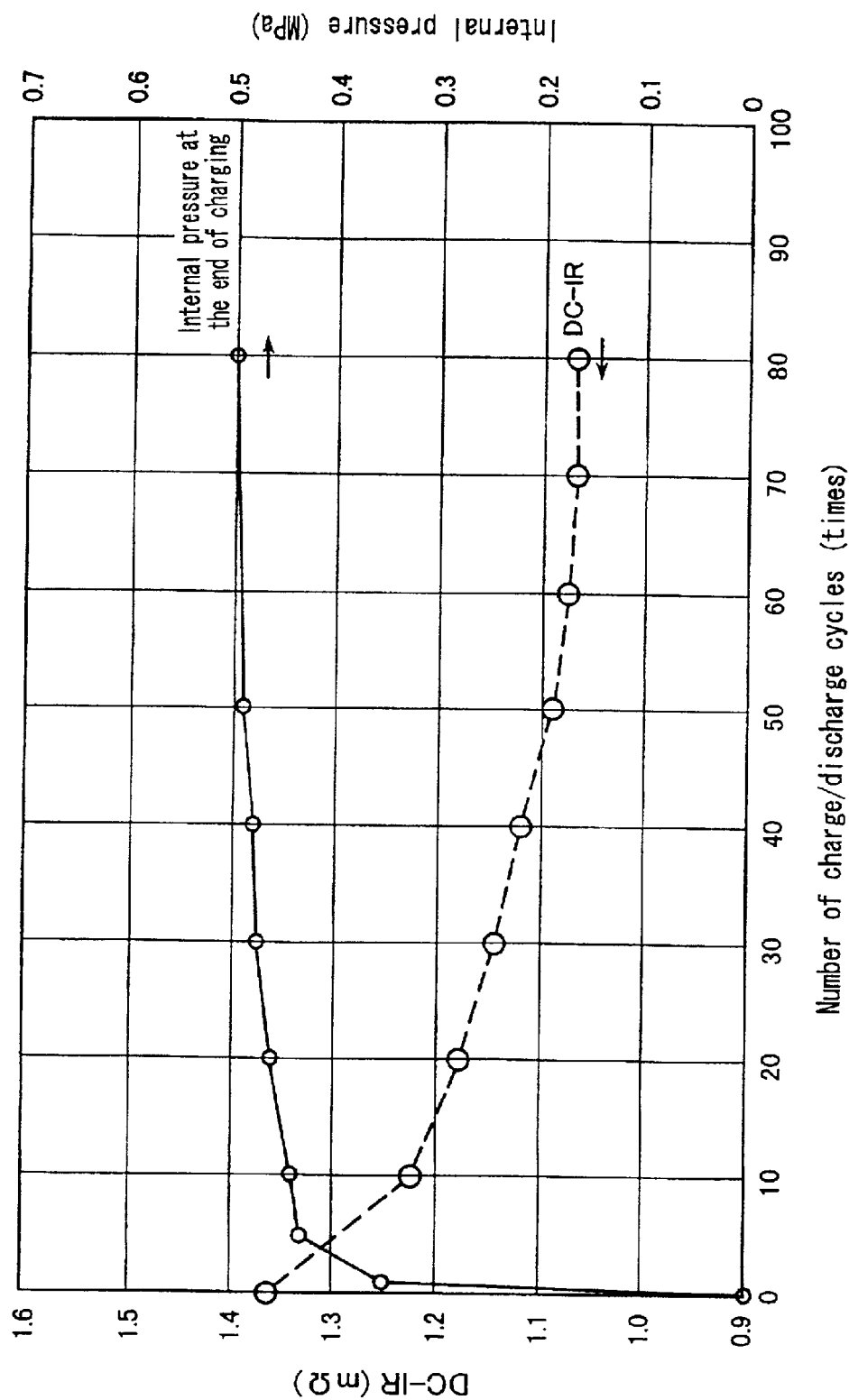
FIG. 5 is a graph showing changes in internal pressure and DC-IR with respect to the number of charge/discharge cycles in the conventional example.
Figure 6:
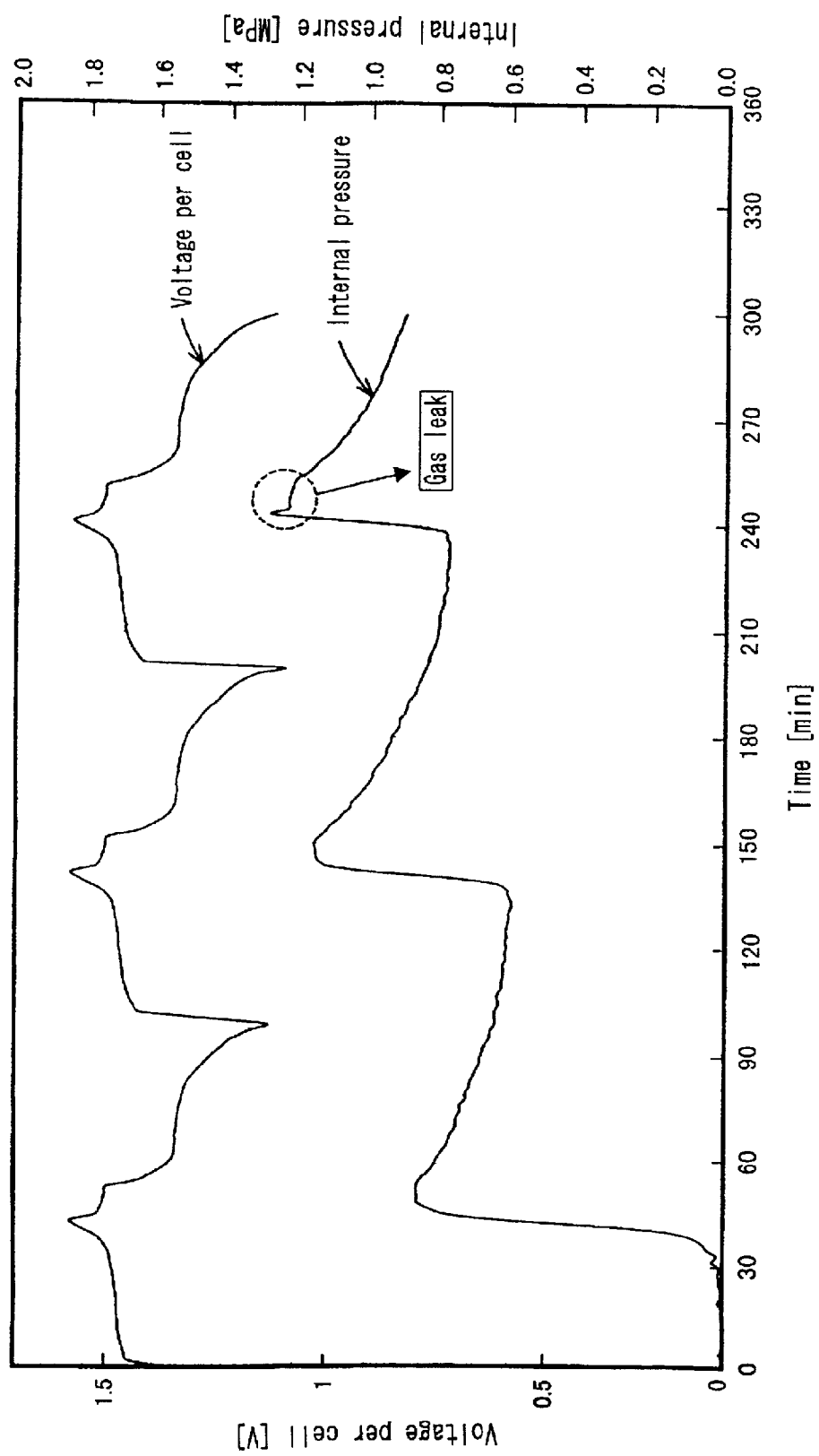
FIG. 6 is a graph showing changes in internal pressure and voltage per cell during the charge/discharge cycles in the conventional example.

FIG. 4 is a graph showing the changes in internal pressure with respect to a charging capacity between the battery activated with the charge/discharge pulse current ($\eta=0.95$) shown in FIG. 1 and that activated with a constant current or constant voltage according to the conventional example. In FIG. 4, Pa denotes an internal pressure of the battery activated by the present embodiment, and Pb denotes an internal pressure of the battery activated by the conventional example shown in FIG. 5 using a constant current or constant voltage. To aid in the above comparison, in the conventional example, the charging is not finished when the capacity of the battery reaches 7 Ah, but is continued until it reaches 14.5 Ah.

As can be seen from FIG. 4, an increase in the internal pressure of the battery activated with the charge/discharge pulse current according to the present embodiment is smaller than that of the battery activated with a constant current or constant voltage according to the conventional example. It is also seen from FIG. 4 that the battery voltage curve of the battery activated with the charge/discharge pulse current according to the present embodiment shows no sign of decrease in voltage due to the memory effect.

The above description has described the embodiment in which the charge/discharge pulse current includes a quiescent period between the charging period and the discharging period. However, if the values of the charge/discharge pulse current in charging and discharge directions are made lower (for example, 4 A in place of 10 A in the above embodiment), increases in internal pressure and temperature of the battery can be suppressed without providing a quiescent period.

As specifically described above, the present invention can produce a remarkable effect of realizing a method for activating a secondary battery that enables a secondary battery to be activated sufficiently until the battery reaches a fully charged condition in a short time without fear that increasing the value of a charging current may result in overcharge to cause increases in internal pressure and temperature, or that decreasing the value of a charging/discharging current may result in the deformation in the charging/discharging voltage curves as in the case of the conventional example.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method for activating a nickel-metal hydride secondary battery to stabilize the battery capacity comprising:

activating a nickel-metal hydride secondary battery during manufacture of the battery with a varying current in which current values are applied in a charge direction and a discharge direction, thereby decreasing an internal resistance of the battery; and repeating alternately application of the current values in the charge and discharge directions in a predetermined cycle;

wherein the varying current is set so that a charge amount into the battery is greater than a discharge amount out of the battery.

2. A method for activating a secondary battery according to claim 1, wherein the varying current is set so that the discharge amount is in a range of 90% to 99.99% of the charge amount with respect to the battery.

3. A method for activating a secondary battery according to claim 1, wherein the varying current has a quiescent period between a period in which the varying current has a value in the charge direction and a period in which the varying current has a value in the discharge direction.

4. A method for activating a secondary battery according to claim 1, wherein the varying current is a pulse current.

* * * * *